United States Patent
Juergens

(10) Patent No.: US 12,061,724 B2
(45) Date of Patent: Aug. 13, 2024

(54) METHOD, SYSTEM, AND SOFTWARE PROGRAM PRODUCT FOR GENERATING TRAINING DATA FOR ENDOSCOPIC APPLICATIONS

(71) Applicant: OLYMPUS Winter & Ibe GmbH, Hamburg (DE)

(72) Inventor: Thorsten Juergens, Hamburg (DE)

(73) Assignee: OLYMPUS WINTER & IBE GMBH, Hamburg (DE)

(*) Notice: Subject to any disclaimer, the term of this patent is extended or adjusted under 35 U.S.C. 154(b) by 297 days.

(21) Appl. No.: 17/700,654

(22) Filed: Mar. 22, 2022

(65) Prior Publication Data
US 2022/0300652 A1 Sep. 22, 2022

(30) Foreign Application Priority Data
Mar. 22, 2021 (DE) .................. 10 2021 107 075.9

(51) Int. Cl.
*G06F 21/62* (2013.01)
*G06T 7/00* (2017.01)
(Continued)

(52) U.S. Cl.
CPC ........ *G06F 21/6254* (2013.01); *G06T 7/0012* (2013.01); *G06V 10/7747* (2022.01); *G06V 40/168* (2022.01); *G06T 2207/10068* (2013.01)

(58) Field of Classification Search
CPC ............ G06F 21/6254; G06V 10/7747; G06V 40/168; G06T 7/0012; G06T 2207/10068
(Continued)

(56) References Cited

U.S. PATENT DOCUMENTS

2020/0372180 A1* 11/2020 Venkataraman ..... A61B 90/361
2021/0174518 A1* 6/2021 Ishikake ................. G06T 7/246
(Continued)

FOREIGN PATENT DOCUMENTS

DE 10 2020 105 835 A1 9/2021
DE 10 2020 116 473 A1 12/2021
(Continued)

OTHER PUBLICATIONS

Shraddha Gulati; Artificial intelligence in luminal endoscopy; IEEE: year:2020; pp. 1-15.*

*Primary Examiner* — Monjur Rahim
(74) *Attorney, Agent, or Firm* — Scully, Scott, Murphy & Presser, P.C.

(57) ABSTRACT

A method for generating training data for endoscopic applications, in which stored image data comprising individual images or video data from endoscopic procedures/examinations are prepared as training data for machine learning applications. Wherein the method includes: (a) subjecting the image data to an image recognition algorithm for determining: (i) whether the stored image data was captured inside or outside a body, and (ii) whether text information and faces are contained in the stored image data, and (b) subjecting the image data to an image processing algorithm, with which the image data, depending on the result in (a): (i) are anonymized by obscuring or removing text information and faces when the stored image data is determined to have been captured outside of a body, and (ii) are anonymized by obscuring or removing text information when the stored image data is determined to have been captured inside of a body.

9 Claims, 2 Drawing Sheets

(51) Int. Cl.
*G06V 10/774* (2022.01)
*G06V 10/82* (2022.01)
*G06V 20/52* (2022.01)
*G06V 20/62* (2022.01)
*G06V 40/16* (2022.01)

(58) Field of Classification Search
USPC .......................................................... 726/26
See application file for complete search history.

(56) References Cited

U.S. PATENT DOCUMENTS

| | | | |
|---|---|---|---|
| 2021/0307808 A1 | 10/2021 | Krüger | |
| 2021/0397865 A1 | 12/2021 | Juergens | |
| 2022/0020496 A1* | 1/2022 | Saito | G06T 7/0012 |
| 2022/0045617 A1 | 2/2022 | Carden | |
| 2022/0104822 A1* | 4/2022 | Shelton, IV | A61B 5/0075 |
| 2022/0233229 A1 | 7/2022 | Jürgens et al. | |

FOREIGN PATENT DOCUMENTS

| | | | | |
|---|---|---|---|---|
| DE | 10 2021 101 410 A1 | 7/2022 | | |
| JP | 2007-044239 A | 2/2007 | | |
| JP | 2012-217631 A | 11/2012 | | |
| WO | WO-2012073119 A2 * | 6/2012 | ....... | G06F 17/30259 |
| WO | 2019/244896 A1 | 12/2019 | | |

\* cited by examiner

METHOD, SYSTEM, AND SOFTWARE PROGRAM PRODUCT FOR GENERATING TRAINING DATA FOR ENDOSCOPIC APPLICATIONS

CROSS-REFERENCE TO RELATED APPLICATION

The present application is based upon and claims the benefit of priority from DE 10 2021 107 075.9 filed on Mar. 22, 2021, the entire contents of which is incorporated herein by reference.

BACKGROUND

Field

The present disclosure relates to a method, a system, and a software program product for generating training data for endoscopic applications, in which stored individual images and/or video data from endoscopic procedures or examinations are prepared as training data for machine learning applications.

Prior Art

Endoscopic procedures, which also include laparoscopic procedures as a special case, are increasingly accompanied by video technology. For this purpose, video endoscopes with integrated video units including one or more image sensors and readout electronics are used as well as endoscopes with video heads that can be placed onto them and which comprise the corresponding components and receive and process light from the ocular of the respective endoscope, or respectively its laparoscopic equivalents. With these video endoscope instruments, video data and, if applicable, individual images are captured, displayed, stored, and processed. In addition to the direct display for the physician who carries out the procedure or examination, these video data and individual images also serve as documentation and as a database for subsequent diagnosis of injuries, abnormal tissue changes, disorders, and much more.

There are applications to evaluate the video data from endoscopic interventions during the procedure or respectively the examination and to use the results of the image evaluation for direct control of operating parameters of the endoscope system. By way of example, the applicant's German patent application No. 10 2020 105 835.7 discloses a method for supporting an HF surgical procedure in which a tissue is cut or coagulated with an HF electrode of an endoscopic HF instrument, wherein, for various tissue types, various HF modes adapted to the tissue types are available. The endoscopic HF instrument is equipped with an optical capture device, the field of view of which is oriented toward the tissue to be treated by means of the HF electrode. Immediately before or respectively during the treatment of the tissue, an optical classification of the tissue type of the tissue to be treated is performed and an HF mode appropriate for the detected tissue type is set.

In the applicant's German patent application No. 10 2020 116 473.4, a method for endoscopic imaging is described in which white-light images are captured with a video endoscope using white-light illumination and are evaluated by the image evaluation unit for the presence of at least one structure with at least one predefined characteristic in real time. If the image evaluation unit detects the presence of a corresponding structure in a white-light image, a special-light illumination is generated with a special light and images of a video stream are captured using the special-light illumination, which images are subjected to image processing in a special-light processing mode.

The applicant's German patent application No. 10 2021 101 410.7 further relates to a method for controlling a surgical HF generator during an HF surgical procedure with an HF surgery hand-held instrument. Here, an operating field is monitored by means of a video endoscope, which records a series of images. The recorded images are subjected to automatic real-time image recognition, in which they are evaluated for structures of one or more structure types and/or operating situations of one or more operating situation types. If a predetermined structure or operating situation is detected, a change of one or more operating parameters and/or operating modes of the HF generator is proposed or performed.

Some of these applications of image recognition in video endoscopy are based on instances of machine learning, for example, but not exclusively, on the basis of the training of artificial neural networks, called "neural networks" for short in the following. Such neural networks, such as convolutional neural networks (CNNs), are particularly well suited to rapid recognition of structures or objects in images. For this purpose, they are trained using training images or respectively training videos, some of which show the structures that should later be recognized in use. While the training is a very computationally intensive process, the image processing takes place very quickly with the neural network and enables real-time image analysis.

The applications specified here can be implemented in different ways. A separate neural network can be trained for each use case, for example. However, because very similar images arise during endoscopic procedures and interventions, it is also possible to implement the various applications on the basis of neural networks that are very closely related to each other. These closely related neural networks are based on a neural network that, expressed in a very simplified manner, was trained first on the basis of a common basis of image and video data, from which copies are then differentiated and trained further for the various applications.

A basic problem in training neural networks for medical, such as endoscopic, applications is a scarcity of available training data. Therefore, basic training is usually performed using more readily available image data. This can be images of everyday objects, animals, plants, and persons, but also endoscopic procedures and/or examinations to which classifications determined by humans have been added as metadata. This initial training can be performed in a supervised or unsupervised manner as "deep learning", using an initial set of classifiers suitable for describing certain features of the image data that are present in the previously manually edited metadata. The structures of the input-side deeper neuron layers adapt to the image material used for the training; the output-side upper neuron layers form classifiers for the aforementioned initial classifications that are the basis for the training.

A network trained on non-medical images can be further trained using endoscopic images, wherein either all or, less computationally intensive, only the upper layers are unlocked for optimization, while the lower layers remain frozen.

When the neural network has undergone its initial training with endoscopic images, an additional adaptation to various questions or respectively applications can take place. For this purpose, the lower layers of the neural network are frozen and only the uppermost layers, which form the classifiers, are unfrozen, so that they can be trained on new classifiers such as specific tissue types, operating situations, etc., which are required for a specific application. This subsequent training, which is typically monitored, then leads to a neural network that stems from the original neural network and achieves good results for the trained application. The derived neural networks thus have, again expressed in a very simplified manner, the same lower layers and differ only in the upper classifier layers.

As stated earlier, neural network training with respect to endoscopic applications faces the problem of scarcity of training data. In addition to the scarcity of trained specialists who can classify the recordings of procedures and examinations that have been made available, an additional obstacle is the necessity of complying with privacy regulations. Training data for machine learning must not contain any information that could be associated with specific individuals. This means that neither patients nor physicians can be identifiable. Many individual images and video recordings of endoscopic procedures and examinations, however, are underlaid with various text components that contain, for example, a name of a patient, a hospital, a device, an attending physician, or the date of the procedure and the like. Such image data cannot be used as training data.

Furthermore, it can also occur that image data captured by an endoscope before or after the procedure or the examination show faces of patients or other persons, thereby also revealing their identity.

SUMMARY

An object is therefore to facilitate the generation of training data for endoscopic applications based on an arbitrary selection of image data from endoscopic procedures and examinations.

Such object can be solved by a method for generating training data for endoscopic applications, in which stored individual images and/or video data from endoscopic procedures or examinations are prepared as training data for machine learning applications, wherein
   a) the individual images and/or video data are first subjected to an image recognition algorithm, with which it is detected
      i) whether the recordings of the individual images and/or video data were captured inside or outside of a body, and
      ii) whether text information and/or faces are contained in the individual images and/or video data, wherein
   b) the individual images and/or video data are then subjected to an image processing algorithm, with which the individual images and/or the video data, depending on the result of the image recognition algorithm in a) i),
      i) are anonymized by obscuring or removing text information and faces, if present, when the recordings of the respective individual images and/or video data were captured outside of a body, and
      ii) are anonymized by obscuring or removing all text information, if present, when the recordings of the respective individual images and/or video data were captured inside of a body.

The above method takes into account the understanding that differentiating between whether image data from endoscopes were captured inside of a body or outside of a body is useful in the processing of the image data for producing training data for machine learning applications, because it makes it possible to use specific image recognition algorithms only in specific contexts, thereby increasing the speed of processing.

The image recognition algorithm itself can first detect whether recordings of the individual images and/or video data were captured inside or outside of a body and also whether text information and/or faces are contained therein. The subsequent image processing can then take place depending on the result of whether the recordings originate from inside or from outside of the body, so that, in the case of recordings from inside the body, only text information can be considered, whereas in the case of recordings outside of the body, faces can be obscured or removed as well.

The detection of whether recordings originate from outside or from inside of a body can in turn be based on trained neural networks that have been trained for this distinction. Other, conventional image recognition algorithms can, for example, detect whether the outer edges are brighter than the center of the image based on the brightness distribution, as is the case with images taken from inside the body. Predominantly red colors can also signal that an image originates from the inside of the body. Furthermore, artificial structures such as straight lines and edges can signal that an image originates from outside of a body.

In embodiments, in method step b) i), meaning in the case of recordings from outside of the body, the individual images and/or video data, in their entirety or only locally in regions where text information and/or faces have been detected, can be blurred or colored to obscure or remove text information and faces, such as to only locally obscure or merge the regions where text information and/or faces have been detected. However, in specific cases, for example, when the affected regions make up a larger part of the image, to the entire image can be obscures or respectively colored. In this case, the loss of information for the training is small. Furthermore, in embodiments, in method step b) ii), meaning in the case of recordings from the inside of the body, only image regions with text information can be blurred or colored to obscure or remove text information.

The coloring of the entire image or the image regions to be hidden can take place in various embodiments by blacking out, whiting out, or filling in with a color that matches an average coloration in the image region to be colored, wherein the average color is to be determined such as by excluding pixels that can be clearly associated with the text. Blacking out or whiting out the affected region makes this region immediately recognizable as changed. Coloring in with an average background color makes the change less obvious and can lead to the training of the neuro network being less influenced by it. The feature that the average background color is also determined excluding pixels that can be clearly associated with the text prevents this region from having a darker or lighter coloring compared to the background in the surroundings of the changed region due to the influence of the black or white pixels of the text. This also applies if the text has a color other than black or white, which, for example, is the case when a particularly good color contrast from the rest of the image and therefore particularly good readability should be achieved when the text is superimposed over the image.

In method step a) ii), a differentiation can be made between general text and personally identifying text, wherein text containing the name, ID, or date of birth of the patient, name or ID of the attending physician, or the date of the procedure or other information that could allow individuals to be identified directly or indirectly can be considered as personally identifying text. This means that nonpersonally identifying general text can remain in the training data. The neural network can thus also learn during the training how to handle images laden with text without becoming confused by them during the desired classification.

In such cases, a part of the trained neural network can be to recognize, for example, sequences of characters with various date formats or typical placement of specific information in the images. This results in these regions being assigned a probability with which they contain information to be anonymized or innocuous information, respectively.

Accordingly, during the processing of the image data, it is provided in embodiments that, besides faces, which are also to be anonymized, the obscuring or coloring can only be applied in relation to personally identifying texts but not in relation to general texts.

In various embodiments, the result of the image processing can be stored in method step b) instead of or in addition to the original individual images and/or video data. The storage instead of the original data has the advantage that it requires less space. The stored data can already be the training data to be produced for the machine learning. Storage in addition to the original image data enables the results to be checked and compared to the originals. If the result is inadequate, the process can be run through again with changed parameters, if necessary. The classification in the metadata of the original image data can be adapted or expanded if, for example, systematic mistakes are detected, in order to improve the process of producing the training data.

In embodiments, the image recognition algorithm of method step a), such as in relation to the detection of whether the individual images and/or video data were captured inside or outside of a body, the presence and the content of texts, and the identification of the regions to be obscured or colored, can be based on one or more trained neural networks.

Such object can also achieved by a system for generating training data for endoscopic applications, comprising a mass storage device with individual images and/or video data from endoscopic procedures or examinations, as well as a data processor that is configured to subject the individual images and/or video data to an image recognition algorithm according to a) above and an image processing algorithm according to b) above of the previously described method and to save the processed individual images and/or video data as training data, such as in the mass storage device.

The system thus realizes the same properties, features, and advantages as the previously described method.

Such object can be further achieved by a software program product with program code means, which, when run in the data processor of the previously described system, configure the data processor of the system to call up the individual images and/or video data from the mass storage device of the system, to subject them to an image recognition algorithm according to a) above and an image processing algorithm according to b) above of the previously described method, and to save the processed individual images and/or video data as training data, such as in the mass storage device.

The software program product thus also realizes the same properties, features, and advantages as the previously mentioned subject matter. The same applies to storage media, rewritable or writable only once, that store a previously described software program product for a data processing unit in a manner that can be called up and executed.

BRIEF DESCRIPTION OF THE DRAWINGS

Further features will become evident from the description of embodiments, together with the claims and the appended drawings. Embodiments can fulfill individual features or a combination of several features.

The embodiments are described below, without restricting the general idea of the invention, based on exemplary embodiments in reference to the drawings, whereby we expressly refer to the drawings with regard to the disclosure of all details that are not explained in greater detail in the text. In the drawings.

In the drawings, the same or similar elements and/or parts are, in each case, provided with the same reference numerals such that they are not introduced again in each case.

DETAILED DESCRIPTION

Figure 1:
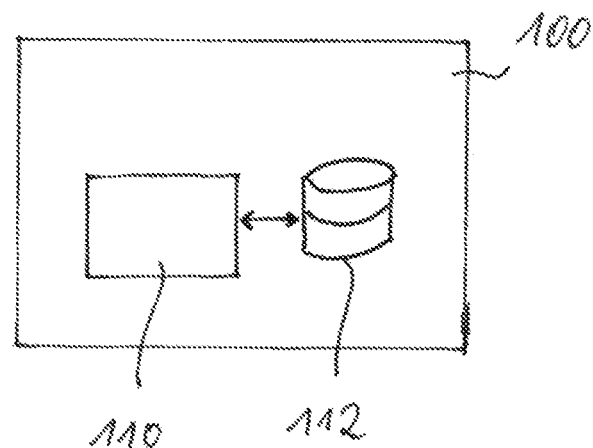
FIG. 1 illustrates a schematic depiction of a system.

FIG. 1 schematically shows a system 100 for generating training data for endoscopic applications. The system 100 comprises basically a data processor 110 and a mass storage device 112, which exchange data with each other. The mass storage device 112 can be part of the data processor 110 or a locally arranged mass storage system, for example network attached storage (NAS), or also a mass storage system in the cloud.

The mass storage device 112 stores a plurality of individual images and/or video data that were captured with endoscopes during procedures or examinations and from which training data are to be created as a basis for machine learning for various applications in the field of image evaluation in endoscopy. The mass storage device 112 can also store an instance of a trained neural network or one which is to be trained and is called up from the data processor 110 and can be saved back to the mass storage device 112 after an optimization. The data processor 110 can also save the processed image data of the individual images and/or video data as training data in the mass storage device 112.

The data processor 110 can be a computer or a system with multiple computers communicating with each other, or also a cloud service, meaning a cloud-based server. Software that executes a method described below runs on the data processor 110.

Figure 2:
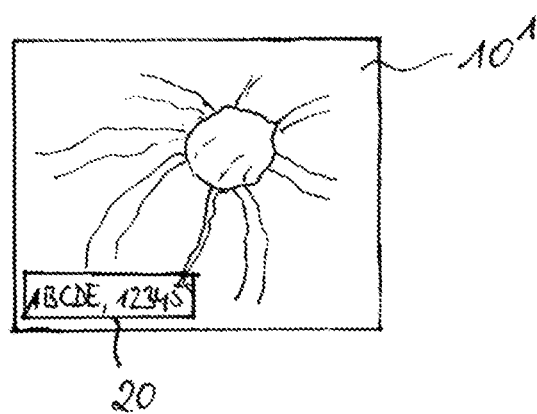
FIG. 2 illustrates an exemplary schematic representation of an image captured by an endoscope inside of a body.
Figure 3:
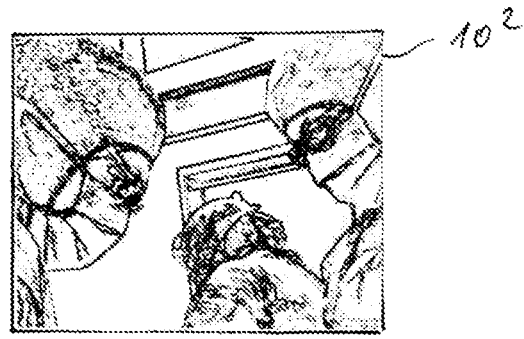
FIG. 3 illustrates an exemplary schematic representation of an image captured by an endoscope outside of a body.

FIGS. 2 and 3 show two examples of image data $10^1$ and $10^2$. The image $10^1$ schematically shows a view that an endoscope can display from a body cavity of a patient. In this case, it can be an intestine, a stomach, or the like; in the case of special laparoscopic recordings, it can be views of the abdominal cavity. In the lower left corner, text information is displayed in a region 20, which can display, for example, patient data, operation data or the like which allow conclusions to be drawn about persons involved, such as, for example, the patient or the operating physician.

Overall, however, the image $10^1$ is dominated by the image data from the endoscope and is thus suitable for generating training data. For this purpose, the text information must be anonymized.

The image $10^2$ shown in FIG. 3 shows, in schematic form, a scene from the surroundings of an operation and thus a situation in which an endoscope is not yet or no longer inserted into a body cavity of a patient. The image $10^2$ shows three persons who are involved in the operation, along with structures from the operating room. The attending persons wear operating masks but may possibly be identifiable upon closer analysis. The present image $10^2$ contains no text information; however, such could also be underlaid under the image.

For the image data of the image $10^2$, which are dominated by the heads of the persons shown, it may be useful to completely exclude the image from the training data. However, it is also relevant for the neural network being trained to be able to differentiate whether an image originates from inside of a body or from outside of a body, and for this reason training images from outside of a body are also required. In the case of image $10^2$, it is necessary to make the faces of the depicted persons unrecognizable by, for example, applying a blur filter or coloring the corresponding image regions.

Figure 4:
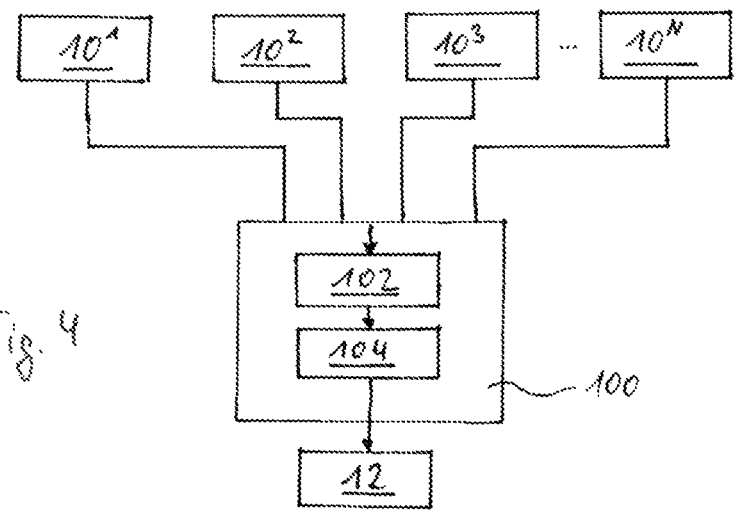
FIG. 4 illustrates a schematic depiction of a general flow diagram of a method, and FIG. 5 according to the invention a detailed schematic depiction of a part of a method.

FIG. 4 schematically shows a flow diagram of a method. The image data $10^1, 10^2, 10^3, \ldots, 10^N$ stored in the mass storage device 112 shown in FIG. 1 serve as input for the system 100, in which an image recognition algorithm 102 and an image processing algorithm 104 runs for each of the image data $10^1, 10^2, 10^3, \ldots, 10^N$ in the data processor 110 shown in FIG. 1. The image recognition algorithm 102 establishes whether the images with the image data $10^1, 10^2, 10^3, \ldots, 10^N$ originate from inside or from outside of a body and whether faces and/or text information are present therein. If desired, it can also be established whether any text information found enables involved persons to be identified. For this purpose, it is ascertained whether the text information fits to one of a selection of patterns that allow corresponding conclusions, for example, whether they have a date format or a name format.

In the image processing algorithm 104, the image data $10^1, 10^2, 10^3, \ldots, 10^N$ are processed using the results of the image recognition algorithm 102 and the found regions or, if applicable, entire images are obscured or colored with suitable means. The resulting processed images are saved again in the mass storage device 112 as training data 12. Alternatively, they can also be saved at a different location, for example in another mass storage device.

Figure 5:
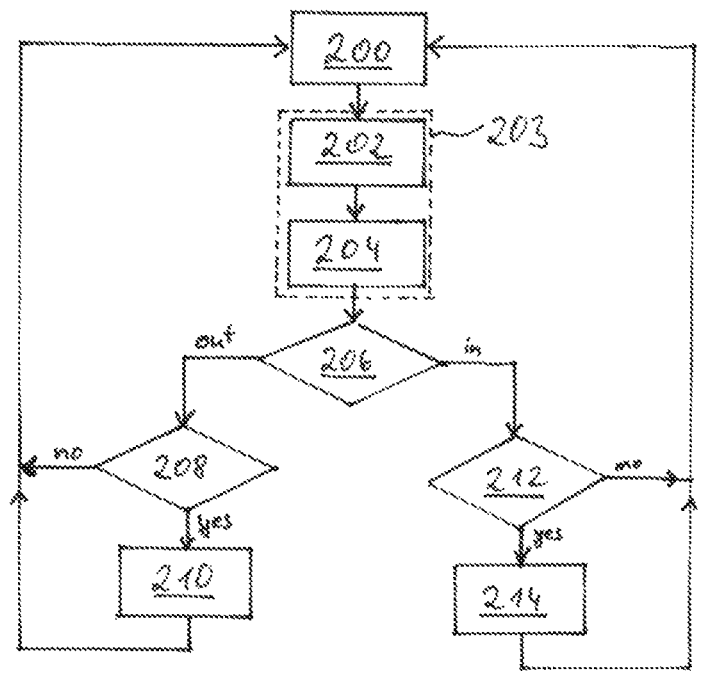

FIG. 5 shows the central part of the method in more detail. In method step 200, image data $10^1, 10^2, 10^3, \ldots, 10^N$, each from one of the images stored in the mass storage device 112, are loaded one after the other into the data processor 110, beginning with the image data $10^1$ of the first stored image, and in method step 202 are subjected to an image recognition algorithm, with which it is established whether the images originate from outside or from inside of a body. The result is saved as an intermediate result. Then, in method step 204, the same image is subjected to an image recognition algorithm, which detects the presence of text information in the image and marks the corresponding regions. The image recognition can be based on multiple separate algorithms that together result in the image recognition algorithm. Alternatively, the image recognition of the location and the text can also take place in a joint method step 203 that combines the steps 202 and 204.

After completion of the image recognition on the image data $10^1, 10^2, 10^3, \ldots, 10^N$ of the loaded image, the image is processed corresponding to the image processing algorithm 104 from FIG. 4. This includes first deciding in a decision step 206 whether the image originates from inside or outside of a body. For this purpose, the intermediate result from method step 202 is used. If an image originates from outside of a body ("out"), the left branch of the further method steps 208, 210 is chosen. In the decision step 208, it is queried whether text information and/or faces are present in the image. If this is the case ("yes"), the region with text information and/or faces in the image is obscured or respectively removed, or, if applicable, the entire image is obscured or colored, in method step 210. The result is saved. The method then returns to method step 200, where image data of a next image are loaded.

If the decision step 208 comes to the result that no text and no faces are present in the image, the branch "no" is taken and the algorithm returns immediately to the beginning with the method step 200. The image itself is saved as part of the training data. In method step 200, the image data $10^1, 10^2, 10^3, \ldots, 10^N$ of the next image are loaded and subjected to the image recognition and image processing.

If it was established in the decision step 206 that an image originates from inside of a body ("in"), a decision step 212 of whether text is present in the image takes place. This is the result of the image recognition algorithm 204 for text. If text is present (branch "yes"), the text region of the image is obscured or removed in method step 214, the processed image is saved with the training data, and the algorithm returns to method step 200, where the image data of the next image are loaded from the mass storage device 112.

If, however, the decision 212 of whether text is in the image comes to the result that no text is present ("no"), the algorithm returns immediately to method step 200 and the data of the next image is loaded. This takes place until all image data of individual images and/or video data that have not yet been processed are processed in this manner.

Instead of strictly sequentially processing the image data $10^1, 10^2, 10^3, \ldots, 10^N$ in sequence, parallel processing of multiple images can also take place simultaneously, which significantly reduces the time required to process the image data $10^1, 10^2, 10^3, \ldots, 10^N$ of all stored images.

The resulting saved training data are completely anonymized and thus suitable for use in neural networks or other examples of machine learning, where they are used to support specific applications for endoscopic procedures and examinations. This can be, for example, the question of what tissue types are present at a particular moment, in order to adapt HF modes, for example, or to automatically recognize in specific examinations whether the use of special-light illumination is necessary and then to carry this out automatically.

While there has been shown and described what is considered to be embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

LIST OF REFERENCE SIGNS $10^{1, 2, \ldots, N}$ Image data
12 Training data

20 Region with text information
100 System
102 Image recognition algorithm
104 Image processing algorithm
110 Data processor
112 Mass storage device
200 Loading image data
202 Image recognition algorithm, location
203 Image recognition algorithm, location and text
204 Image recognition algorithm, text
206 Decision: Image from inside or outside of a body
208 Decision: Text and/or face in image?
210 Obscuring/removing text and/or face and saving
212 Decision: Text in image?
214 Obscuring/removing text and saving

The invention claimed is:

1. A method for generating training data for endoscopic applications, in which stored image data comprising one or more of individual images and video data from endoscopic procedures or examinations are prepared as training data for machine learning applications, wherein the method comprises:
   (a) subjecting the image data to an image recognition algorithm for determining:
      (i) whether the stored image data was captured inside or outside of a body, and
      (ii) whether one or more of text information and faces are contained in the stored image data, and
   (b) subsequent to (a), subjecting the image data to an image processing algorithm, wherein the image data, depending on the result of the image recognition algorithm:
      (i) are anonymized by one of obscuring or removing text information and faces, if present, when the stored image data is determined to have been captured outside of a body, and
      (ii) are anonymized by one of obscuring or removing at least a portion of text information, if present, when the stored image data is determined to have been captured inside of a body;
   wherein one of:
      in b) i), where the one or more of text information and faces are detected, the detected one or more of text information and faces in the image data are one of obscured or removed; or
      in b) ii), only image regions in the image data in which the text information is detected, are obscured or removed; and
   wherein the obscuring comprises one of whiting out, or filling in with a color that matches an average coloration in the image region to be obscured; and
   the average coloration is determined by excluding pixels that can be clearly associated with the text information.

2. The method according to claim 1, wherein the average coloration is determined by excluding pixels that can be clearly associated with the text information.

3. The method according to claim 1, wherein, in a) ii), the anonymizing comprises differentiating between general text and personally identifying text.

4. The method according to claim 3, wherein the personally identifying text comprises text containing one of a name, ID, or date of birth of a patient, a name or ID of an attending physician, or a date of a procedure.

5. The method according to claim 4, wherein, in (b) the anonymizing is only applied to personally identifying texts and not to general texts.

6. The method according to claim 1, further comprising (c) storing a result of the image processing algorithm.

7. The method according to claim 1, wherein the image recognition algorithm is based on one or more trained neural networks.

8. A system for generating training data for endoscopic applications, the system comprising:
   a storage device for saving image data comprising one or more of individual images and video data from endoscopic procedures or examinations, and
   a data processor configured to:
      subject the image data to an image recognition algorithm and an image processing algorithm; and
      save the processed image data as training data;
   wherein the image recognition algorithm determines:
      whether the stored image data was captured inside or outside of a body, and
      whether one or more of text information and faces are contained in the stored image data, and
   the image processing algorithm, wherein the image data, depending on the result of the image recognition algorithm:
      (i) are anonymized by obscuring or removing text information and faces, if present, when the stored image data is determined to have been captured outside of a body, and
      (ii) are anonymized by obscuring or removing all text information, if present, when the stored image data is determined to have been captured inside of a body;
   wherein one of:
      in (i), where the one or more of text information and faces are detected, the detected one or more of text information and faces in the image data are one of obscured or removed; or
      in (ii), only image regions in the image data in which the text information is detected, are obscured or removed; and
   wherein the obscuring comprises one of whiting out, or filling in with a color that matches an average coloration in the image region to be obscured; and
   the average coloration is determined by excluding pixels that can be clearly associated with the text information.

9. A non-transitory computer-readable storage medium storing instructions that cause a computer to at least perform a method for generating training data for endoscopic applications, in which stored image data comprising one or more of individual images and video data from endoscopic procedures or examinations are prepared as training data for machine learning applications, wherein the method comprises:
   (a) subjecting the image data to an image recognition algorithm for determining:
      (i) whether the stored image data was captured inside or outside of a body, and
      (ii) whether one or more of text information and faces are contained in the stored image data, and
   (b) subsequent to (a), subjecting the image data to an image processing algorithm, wherein the image data, depending on the result of the image recognition algorithm:
      (i) are anonymized by one of obscuring or removing text information and faces, if present, when the stored image data is determined to have been captured outside of a body, and
      (ii) are anonymized by one of obscuring or removing at least a portion of text information, if present, when the stored image data is determined to have been captured inside of a body;

wherein one of:
- in b) i), where the one or more of text information and faces are detected, the detected one or more of text information and faces in the image data are one of obscured or removed; or
- in b) ii), only image regions in the image data in which the text information is detected, are obscured or removed; and wherein the obscuring comprises one of whiting out, or filling in with a color that matches an average coloration in the image region to be obscured; and the average coloration is determined by excluding pixels that can be clearly associated with the text information.

* * * * *